United States Patent
Thatcher

(10) Patent No.: US 11,825,779 B2
(45) Date of Patent: Nov. 28, 2023

(54) SYSTEM AND METHOD FOR ANALYSIS OF CURRENT AND VOLTAGE LEVELS WITHIN A CENTER PIVOT IRRIGATION SYSTEM

(71) Applicant: VALMONT INDUSTRIES, INC., Omaha, NE (US)

(72) Inventor: Tracy A. Thatcher, Gretna, NE (US)

(73) Assignee: VALMONT INDUSTRIES, INC., Omaha, NE (US)

(*) Notice: Subject to any disclaimer, the term of this patent is extended or adjusted under 35 U.S.C. 154(b) by 715 days.

(21) Appl. No.: 17/010,909

(22) Filed: Sep. 3, 2020

(65) Prior Publication Data
US 2021/0076579 A1   Mar. 18, 2021

Related U.S. Application Data

(60) Provisional application No. 62/899,174, filed on Sep. 12, 2019.

(51) Int. Cl.
*A01G 25/00* (2006.01)
*A01G 25/16* (2006.01)
*A01G 25/09* (2006.01)

(52) U.S. Cl.
CPC ........... *A01G 25/16* (2013.01); *A01G 25/092* (2013.01)

(58) Field of Classification Search
CPC .......... B50B 3/18; A01G 25/16; A01G 25/092
See application file for complete search history.

(56) References Cited

U.S. PATENT DOCUMENTS

| | | | | |
|---|---|---|---|---|
| 8,317,114 B1* | 11/2012 | Malsam | ............... | A01G 25/092 239/729 |
| 9,149,012 B1* | 10/2015 | Sorensen | ................. | A45D 2/00 |
| 9,342,076 B2* | 5/2016 | Malsam | ............... | G05D 1/0278 |
| 10,172,303 B2* | 1/2019 | Reed | ..................... | A01G 25/092 |
| 2003/0066912 A1* | 4/2003 | Krieger | ................ | A01G 25/092 239/731 |
| 2012/0053776 A1* | 3/2012 | Malsam | ............... | G05D 1/0268 239/744 |
| 2012/0305682 A1* | 12/2012 | Korus | .................. | A01G 25/097 239/731 |
| 2013/0048747 A1* | 2/2013 | Pfrenger | .............. | A01G 25/092 239/723 |
| 2013/0253752 A1* | 9/2013 | Grabow | ............... | A01G 25/092 701/25 |
| 2016/0378086 A1* | 12/2016 | Plymill | ................. | H04W 4/029 700/284 |
| 2017/0295730 A1* | 10/2017 | Abts | ..................... | A01G 25/092 |
| 2017/0349060 A1* | 12/2017 | Abts | ..................... | A01G 25/092 |
| 2018/0284758 A1* | 10/2018 | Cella | .................. | G05B 23/0283 |
| 2018/0348714 A1* | 12/2018 | Larue | ................... | G05B 13/041 |
| 2019/0021245 A1* | 1/2019 | Thatcher | ............. | G05D 1/0268 |
| 2019/0235091 A1* | 8/2019 | Thatcher | ............. | A01G 25/092 |

* cited by examiner

*Primary Examiner* — Hau V Phan
(74) *Attorney, Agent, or Firm* — Milligan PC LLO

(57) ABSTRACT

The present invention provides a system and method for analyzing drive tower current and voltage levels to determine drive wheel status. In accordance with a first preferred embodiment, the system of the present invention includes a machine analysis module which analyzes data from electrical sensing systems, GPS sensors, and gyroscopic sensors. According to a further preferred embodiment, the machine analysis module applies a current/voltage sensing algorithm which analyzes the status of the first and second drive wheels based on detected operating currents/voltages of selected motors.

16 Claims, 9 Drawing Sheets

SYSTEM AND METHOD FOR ANALYSIS OF CURRENT AND VOLTAGE LEVELS WITHIN A CENTER PIVOT IRRIGATION SYSTEM

RELATED APPLICATIONS

The present application claims priority to U.S. Provisional Application No. 62/899,174 filed Sep. 12, 2019.

BACKGROUND AND FIELD OF THE PRESENT INVENTION

Field of the Present Invention

The present invention relates generally to a system and method for irrigation system management. More specifically, the present invention relates to a system and method for analyzing drive tower current and voltage levels to determine drive wheel status.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote and independent power for a variety of sensors, sprayers, drive control systems, motors and transducers.

The drive control systems of modern irrigation machines are difficult to maintain and monitor. In particular, the status of individual drive wheels often requires physical inspection and monitoring during irrigation operations. This process is time consuming and often inaccurate. Even when closely monitored, it is difficult to assess the actual performance of each drive wheel independent from the loads applied to each wheel and the field conditions for each drive wheel path. Because of this, operators often lack good data regarding the actual field conditions for each drive path. In addition, the operators have no way to analyze or understand variations in drive motor current and voltage readings.

To overcome the limitations of the prior art, a reliable and effective system is needed to provide analysis of drive tower current and voltage levels. Further, a system is needed to determine drive wheel status based on field conditions and the measured current and voltage levels.

SUMMARY OF THE PRESENT INVENTION

To address the shortcomings presented in the prior art, the present invention provides a system and method for analyzing drive tower current and voltage levels to determine drive wheel status. In accordance with a first preferred embodiment, the system of the present invention includes a machine analysis module which analyzes data from current/voltage sensing systems, GPS sensors and gyroscopic sensors. According to a further preferred embodiment, the machine analysis module applies a current sensing algorithm which analyzes the status of selected drive wheels based on the detected electrical current/voltage levels of selected motors.

According to a further preferred embodiment, the current algorithm includes a movement rate algorithm which determines the status of a drive wheel based on a comparison of a commanded speed and a measured machine speed.

According to a further preferred embodiment, the current algorithm includes a field location algorithm which determines the status of a drive wheel based on a comparison of the operating current of the drive wheel and the detected slope of the field at the location of the drive unit.

According to a further preferred embodiment, the current algorithm includes a distance analysis algorithm which determines an amount of traction loss based on a comparison of a calculated distance determined from a commanded speed and a distance measured using RTK-corrected GPS data (RTK, WAAS, or the like).

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
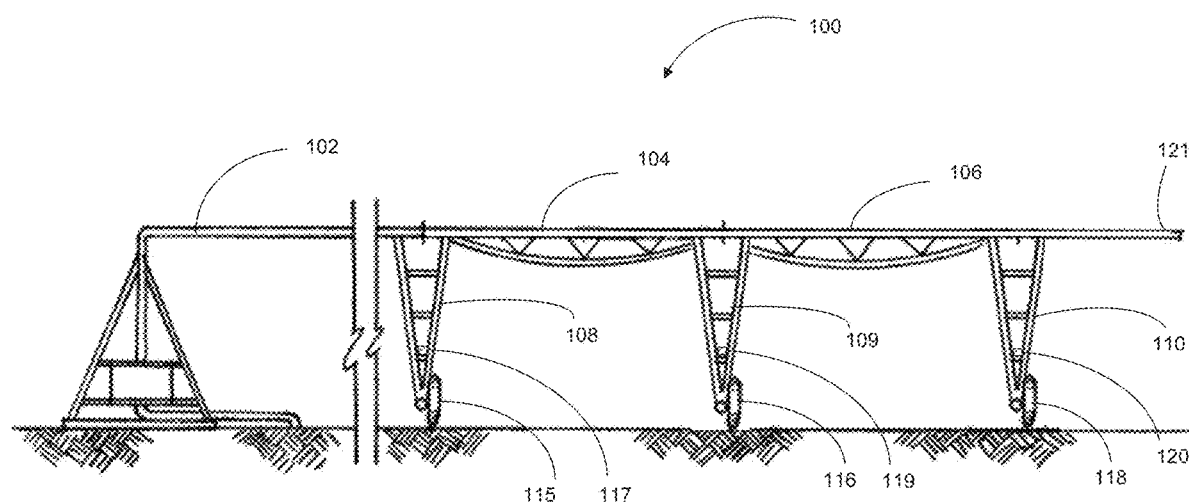
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. The term "data storage" as defined herein includes any type of computer readable media that allows a computer to electronically read and store data thereto. Such data storage can include, for example, non-volatile memory (such as ROM), flash memory, RAM, disk drive memory, CD-ROM, DVD, and other permanent storage media. However, even volatile storage such a RAM, buffers, cache memory, and network circuits are contemplated to serve as data storage according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

In accordance with preferred embodiments of the present invention, it should be understood that the term "drive unit" may preferably include a number of sub-components including: a motor, a controller, a communication device (such as a PLC or the like) and an alignment device. Further, while the invention is discussed below with respect to three exemplary towers, the number of towers used may be expanded or reduced (i.e. 1-100 towers) as needed without departing from the spirit of the present invention. Further, the term "motor" as used herein may refer to any suitable motor for providing torque to a drive wheel. Accordingly, the term "motor" as used herein may preferably include any type of motor including: switch reluctance, induction, gas powered, DC powered, single phase AC and the like.

FIGS. 1-5 illustrate various configurations of irrigation systems which may be used with example implementations of the present invention. As should be understood, the irrigation systems shown in FIGS. 1-5 are exemplary systems onto which the features of the present invention may be integrated. Accordingly, FIGS. 1-5 are intended to be purely illustrative and any of a variety of systems (i.e. fixed systems as well as linear and center pivot self-propelled irrigation systems; stationary systems; corner systems) may be used with the present invention without limitation. For example, the present invention is discussed with reference to specific drive units and drive configurations. However, the present invention may include any of a variety of alternative drive units (i.e. stop/start drive units) and/or drive configurations (i.e. drive units controlled by standard or variable speed drives such as a Variable Frequency Drive or the like) without limitation.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an end gun (not shown). FIG. 1 provides an illustration of an irrigation machine 100 without many added powered elements and sensors.

Figure 3:
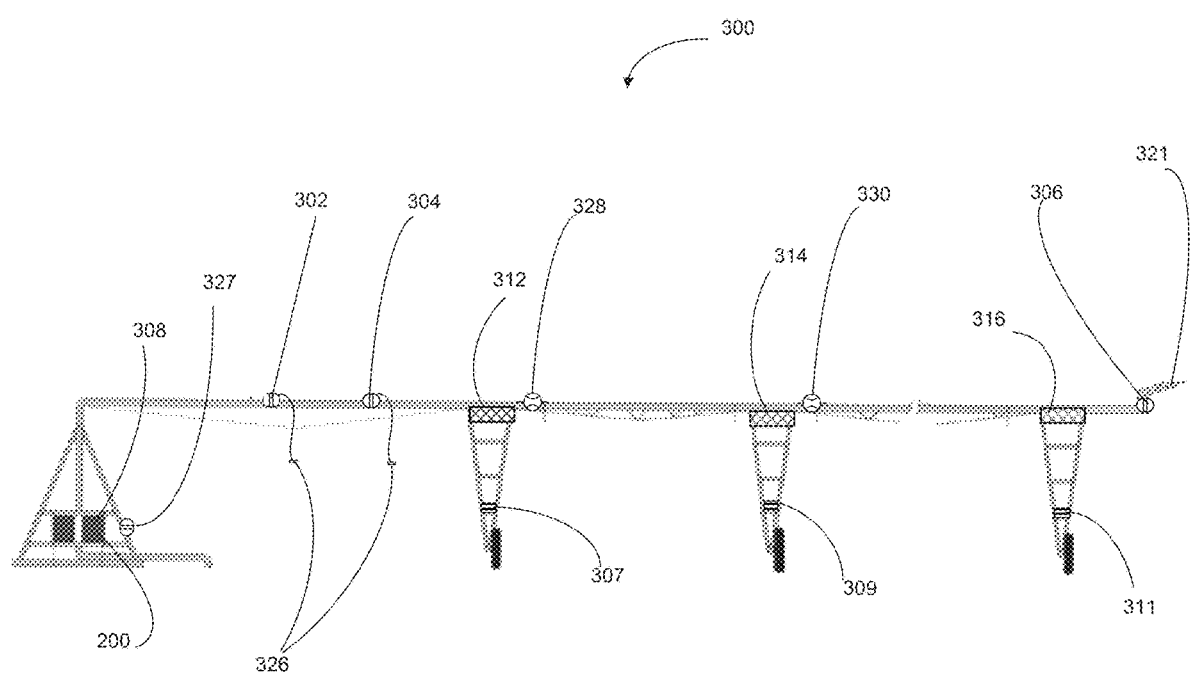
FIG. 3 shows an exemplary irrigation system in accordance with a further preferred embodiment of the present invention.

With reference now to FIG. 3, an exemplary system 300 is shown in which a number of exemplary powered elements are included. As shown, the powered elements may include transducers 327, 328, 330 which are provided to control and regulate water pressure through the system. Further, the system may further include valve controllers 302, 304, 306 to control individual sprinklers including the end gun 321 and other sprinkler heads 326. As further shown, the system may further include solid state tower boxes 312, 314, 316 (including solid-state motor controllers, non-contact alignment devices and other components) which are preferably interconnected to respective drive unit motors 307, 309, 311. Further, the system 300 of the present invention may preferably further include a control/pivot panel 308 which includes a central controller 200 as discussed further below.

Figure 2:
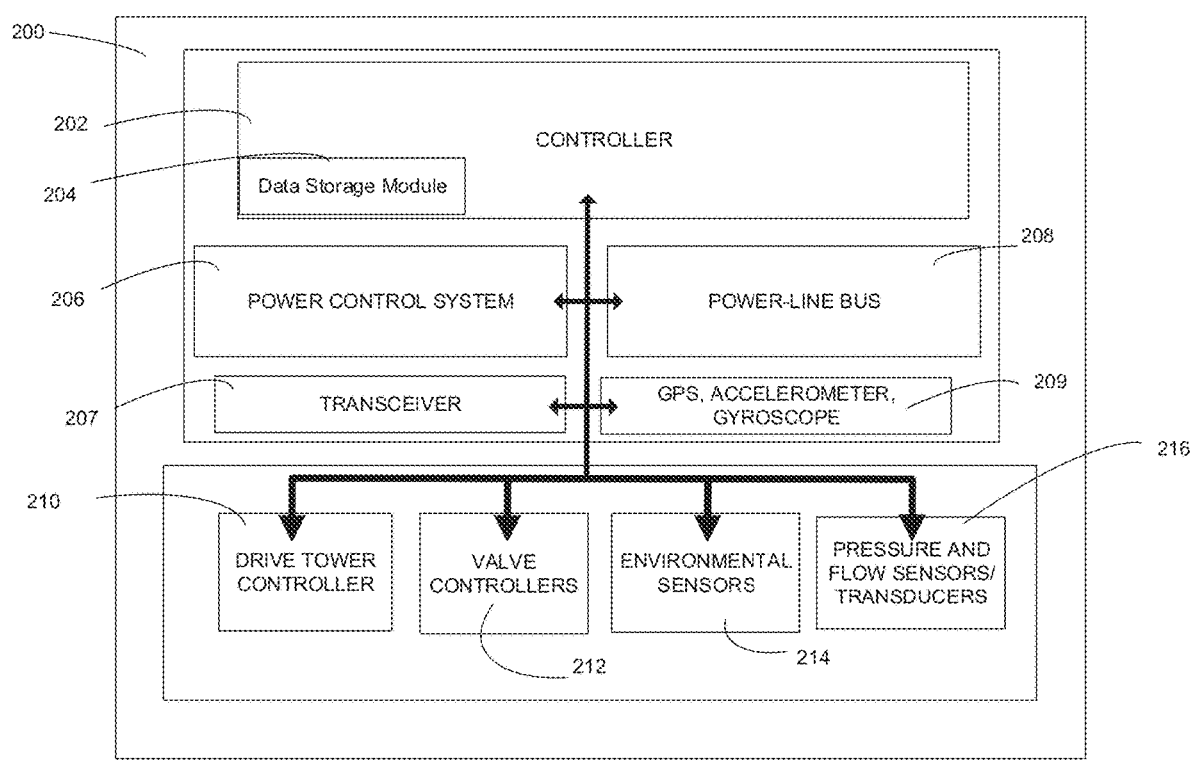
FIG. 2 shows a block diagram illustrating an exemplary processing architecture of a control device in accordance with a first preferred embodiment of the present invention.

With reference now to FIG. 2, an exemplary controller/control device 200 which represents functionality to control one or more operational aspects of the irrigation system 300 shall now be discussed. As shown in FIG. 2, an exemplary control device 200 of the present invention may preferably include a controller/processor 202 having a memory/data storage module 204. The controller 202 preferably provides processing functionality for the control device 200 and may include any number of processors, micro-controllers, or other processing systems. The controller 202 may execute one or more software programs that implement techniques and algorithms described herein. The data storage module 204 is an example of tangible computer-readable media that provides storage functionality to store various data associated with the operation of the control device 200, such as the software program and code segments mentioned above, or other data to instruct the controller 202 and other elements of the control device 200 to perform the steps described herein.

As further shown, the exemplary control device 200 may include a power control system 206 and a power-line BUS 208 which may include conductive transmission lines, circuits and the like for controlling and routing electric power and control signals to devices attached to a power-line carrier system as discussed further below. As further shown, the exemplary attached devices may include a mix of system sensors 209 (i.e. GPS/location detector, accelerometer, gyroscopes/tilt sensor), driver tower controllers 210, valve controllers 212, environmental sensors 214, pressure and flow sensors/transducers 216 and any of a variety of other powered devices as discussed further below. Additionally, the exemplary control device 200 may preferably include or be linked with a transceiver 207 for communicating with remote elements via satellite, cellular, or any other wireless system.

Figure 4:
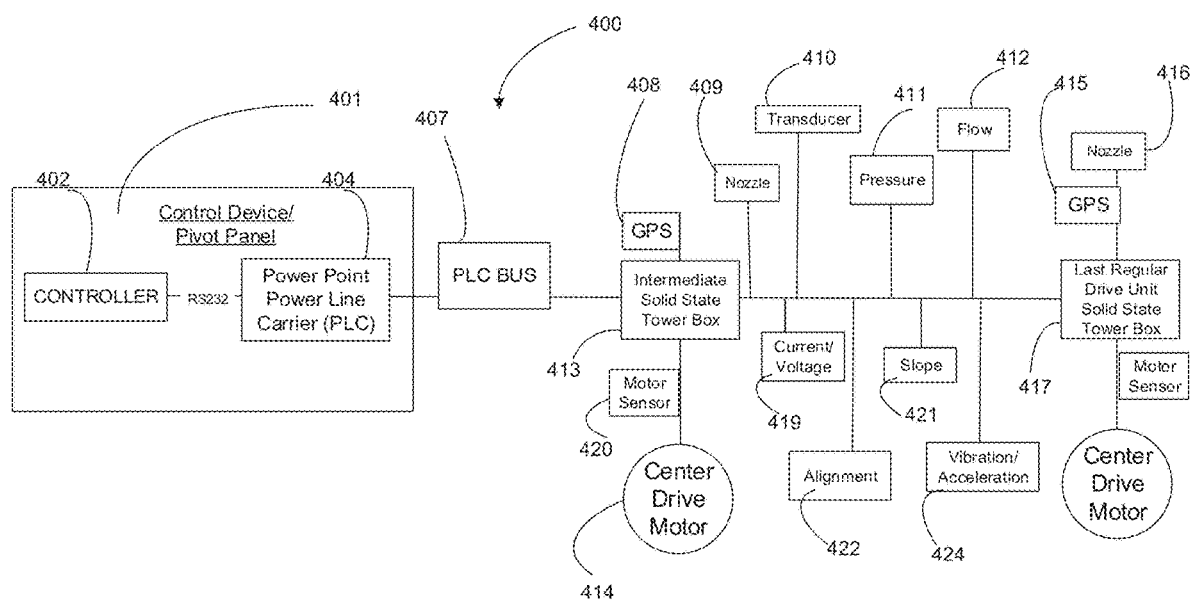
FIG. 4 shows a block diagram of an exemplary communication and control system for use with the present invention.

With reference now to FIG. 4, an exemplary communication and control system of the present invention shall now be discussed. As shown in FIG. 4, an example control device 401 may preferably communicate with and/or provide power to a variety of powered devices, sensors and/or motors of the present invention. According to preferred embodiments, the control device 401 may communicate and/or provide power to these elements via any wired or wireless system.

Further, the communication, control and power signals may be separately controlled and transmitted or may be processed and transmitted together.

The system may preferably further utilize stored data available locally (e.g., at a drive unit or tower) on the machine. According to preferred embodiments, the data of the present invention may transmit via power line carrier or other transmission means (e.g., radio, LoRa, Zigbee, Bluetooth, etc.) to a collection point (e.g., pivot panel or tower box) or to a central or distributed computing unit (e.g., computer, edge computer or cloud) via any suitable system (e.g., radio, cellular modem, Wi-Fi, TCP/IP, power line carrier, etc.).

In the example shown in FIG. 4, a controller 402 may provide power and control signals via a Power Line Carrier (PLC) 404 system via a PLC BUS 407 or the like. As shown, the controller 402 may be integrated within a control device 401 (such as device 200 shown in FIG. 2). The controller 402 may preferably send/receive signals to solid-state tower boxes 413, 417 and other devices. As shown, such devices may include: GPS sensors 408, 415, transducers 410, pressure sensors 411, flow sensors 412, current/voltage sensors 419, alignment sensors 422, vibration/acceleration sensors 424, nozzle controllers 409, 416, gyroscopic sensors/slope 421, motor controllers 414 and motor sensors 420. It should be understood that solid-state tower boxes and the other powered devices are provided purely as examples and the present invention is not intended to be limited to the use of solid-state tower boxes or any particular mix of powered devices. For example, electro-mechanical tower boxes may be used in place of the solid-state tower boxes without departing from the scope of the present invention. Further, separate power lines and control/communication lines (wired and wireless) may be used without limitation.

Figure 5:
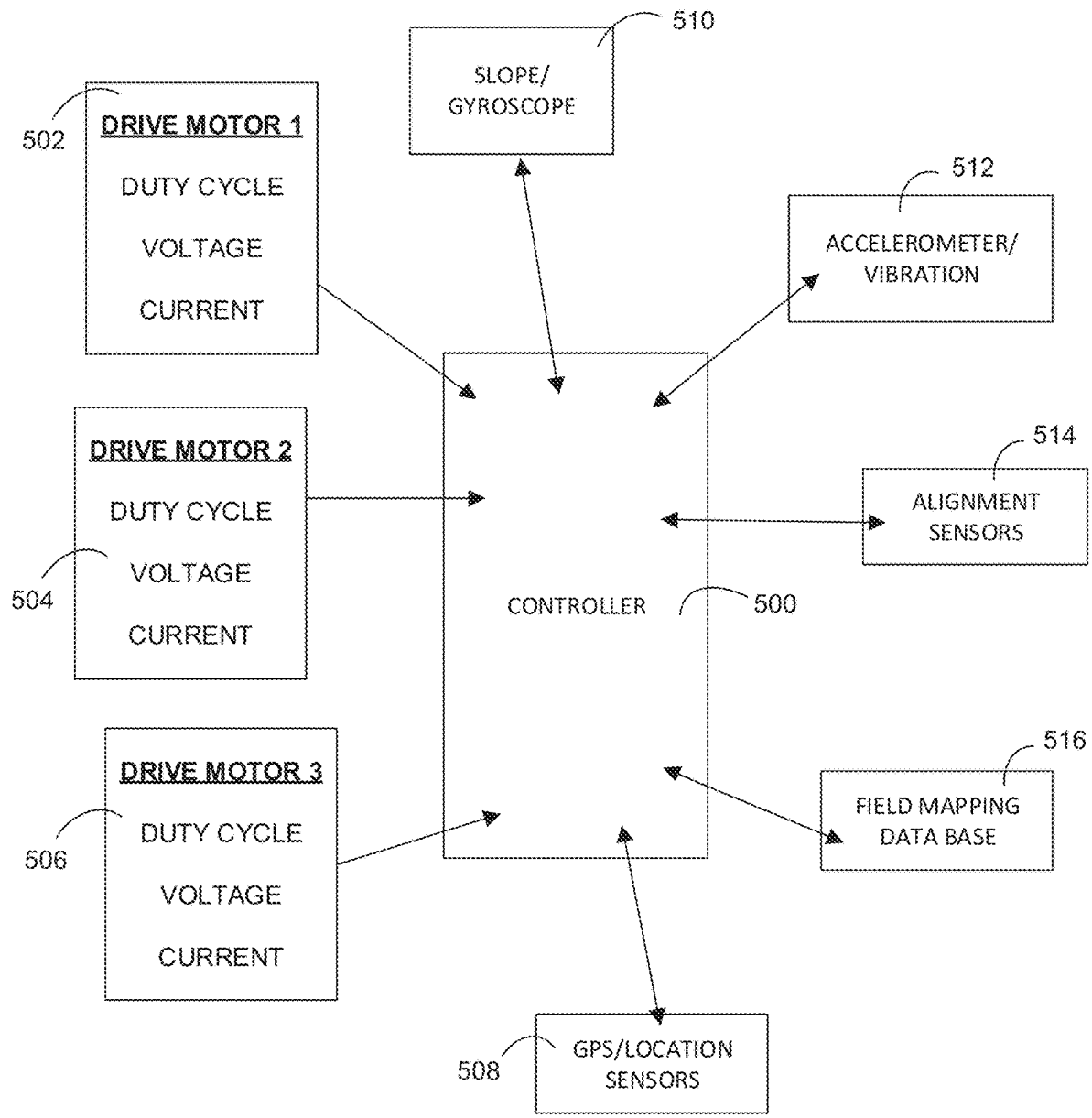
FIG. 5 shows a block diagram illustrating a range of exemplary data inputs in accordance with a further preferred embodiment of the present invention.

With reference now to FIG. 5, a diagram illustrating a further exemplary set of inputs and data provided to the central controller 500 of the present invention is provided. As shown, the systems and devices providing data to the controller 500 may include the inputs listed below.

| Sensor/Device Inputs |
| --- |
| Drive Motor 1 Sensors 502 |
| Drive Motor 2 Sensors 504 |
| Drive Motor 3 Sensors 506 |
| GPS/Location Sensors 508 |
| Slope/Gyroscopic Sensor 510 |
| Accelerometer/Vibration Sensor 512 |
| Alignment Sensors 514 |
| Field Mapping Database 516 |

According to preferred embodiments, the data provided to the controller 500 may alternatively be provided indirectly to the controller 500 via any arrangement of separate processors and data storage. For example, sensor data may first be processed, sorted, analyzed and stored by a separate processor or device. Thereafter, the final processed data may then preferably be accessed by the controller 500 as needed to execute the functions and algorithms of the present invention. Further, a field mapping database 516 or the like may include multiple databases and may include third-party data (e.g. USGS survey data, satellite data, manual survey data) and the like.

The controller(s) of the present invention may preferably process, analyze and apply machine learning algorithms to the sensor and machine data discussed above. Specifically, the data may be analyzed using algorithms and/or machine learning to analyze the incoming data and determine a problem or a predicted problem. Further, the algorithms of the present invention may command an action or recommend an action to the appropriate personnel (e.g., operator, owner, service person, or dealer). Such notifications may also provide selectable options for an operator which may trigger actions by the irrigation machine as discussed further below.

Figure 6:
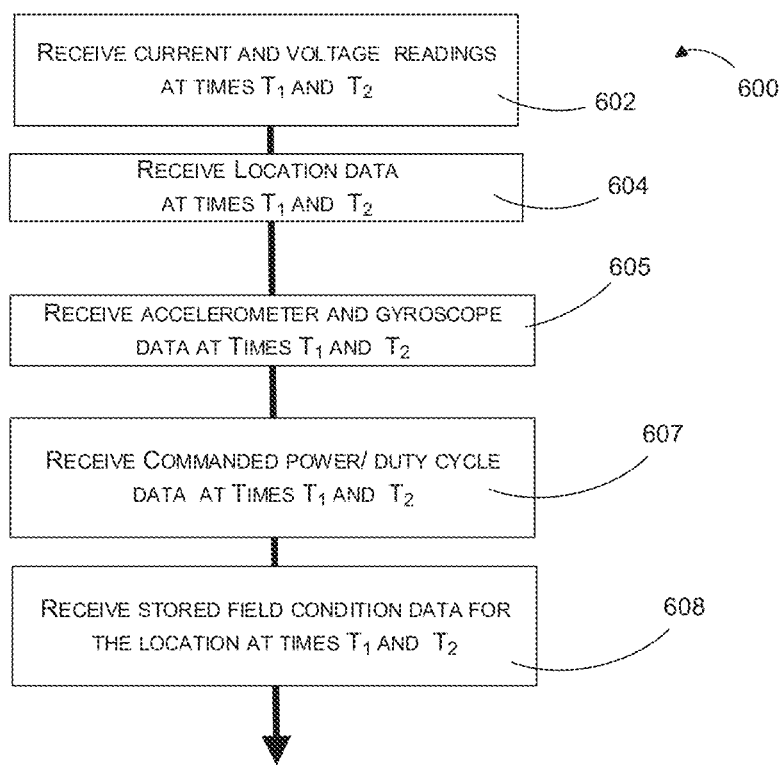
FIG. 6 shows an exemplary algorithm for processing electrical current and voltage data in accordance with a preferred embodiment of the present invention.

With reference now to FIG. 6, an exemplary method/algorithm 600 for analyzing changes in electrical current and/or voltage sensor data shall now be discussed. As discussed further below, the algorithm 600 provided includes steps for receiving and analyzing data from each drive system of an irrigation machine. Preferably, the disclosed method may continually receive and analyze data from multiple drive towers and multiple drive wheels in real-time during irrigation operations. According to a preferred embodiment, the disclosed method may run simultaneously for a set of drive wheels. Alternatively, the method of the present invention may be run sequentially for each drive tower and drive wheel selected.

As shown in FIG. 6, at a first step 602, current and voltage data for a given drive motor may be recorded and stored at times $T_1$ and $T_2$. At a next step 604, location data for the irrigation machine may be recorded and stored at times $T_1$ and $T_2$. At a next step 605, accelerometer and gyroscope data may be recorded and stored at times $T_1$ and $T_2$. At a next step 607, commanded power/duty cycle data (i.e. the system inputted engine power) may be recorded and stored at times $T_1$ and $T_2$. At a next step 608, field condition data for the detected location may be recorded and/or retrieved from memory.

Figure 7:
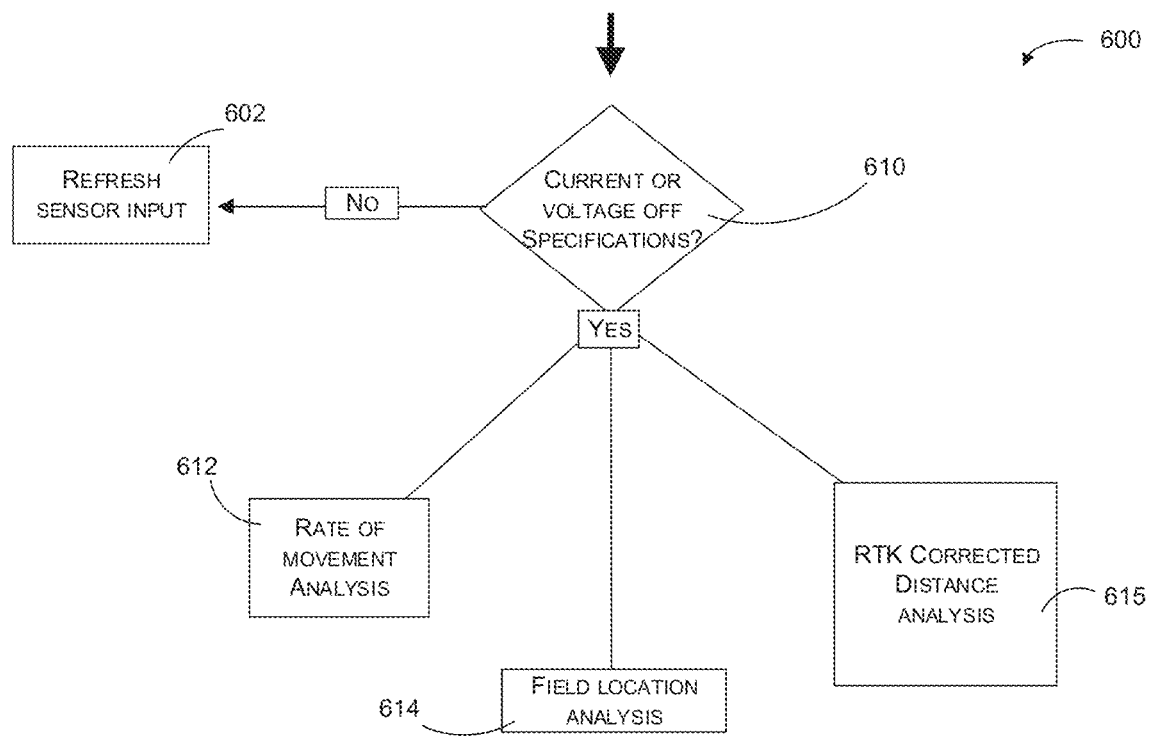
FIG. 7 shows further steps of the exemplary algorithm shown in FIG. 6.

With reference now to FIG. 7, at a next step 610 the system may preferably determine whether the measured current or voltage levels are off specified levels for the given input power level/duty cycle received in step 607. If NO, the system may return to step 602 to receive new data. If YES, the system may proceed to further analyze one or more data inputs. Accordingly, the present invention may proceed to analyze one or more aspects of the rate of movement (step 612), field location (step 614) and/or travel distance (step 615) to determine a status of a given drive tower and/or drive wheel as discussed further below.

Rate of Movement Analysis

With respect to rate of movement analysis (FIG. 7, step 612), the determined rate of movement for a given drive tower may be analyzed to trigger an action using logic, a look-up table or the like. An exemplary look-up table of values and event triggers is provided in Table I and discussed with respect to FIG. 8 below.

TABLE I

| Rate of Movement Analysis | | |
| --- | --- | --- |
| Higher Current (or Power) | GPS Detected Rate of Movement (x) vs Commanded Rate Y | Event Trigger |
| YES | x < 1 ft/min | WHEEL IS STUCK |
| YES | Y (.95) > x > 1 ft/min | WHEEL IS SLIPPING |
| YES | .95(Y) < X < 1.05 (Y) | ELECTRICAL/MECHANICAL FAULT |

Figure 8:
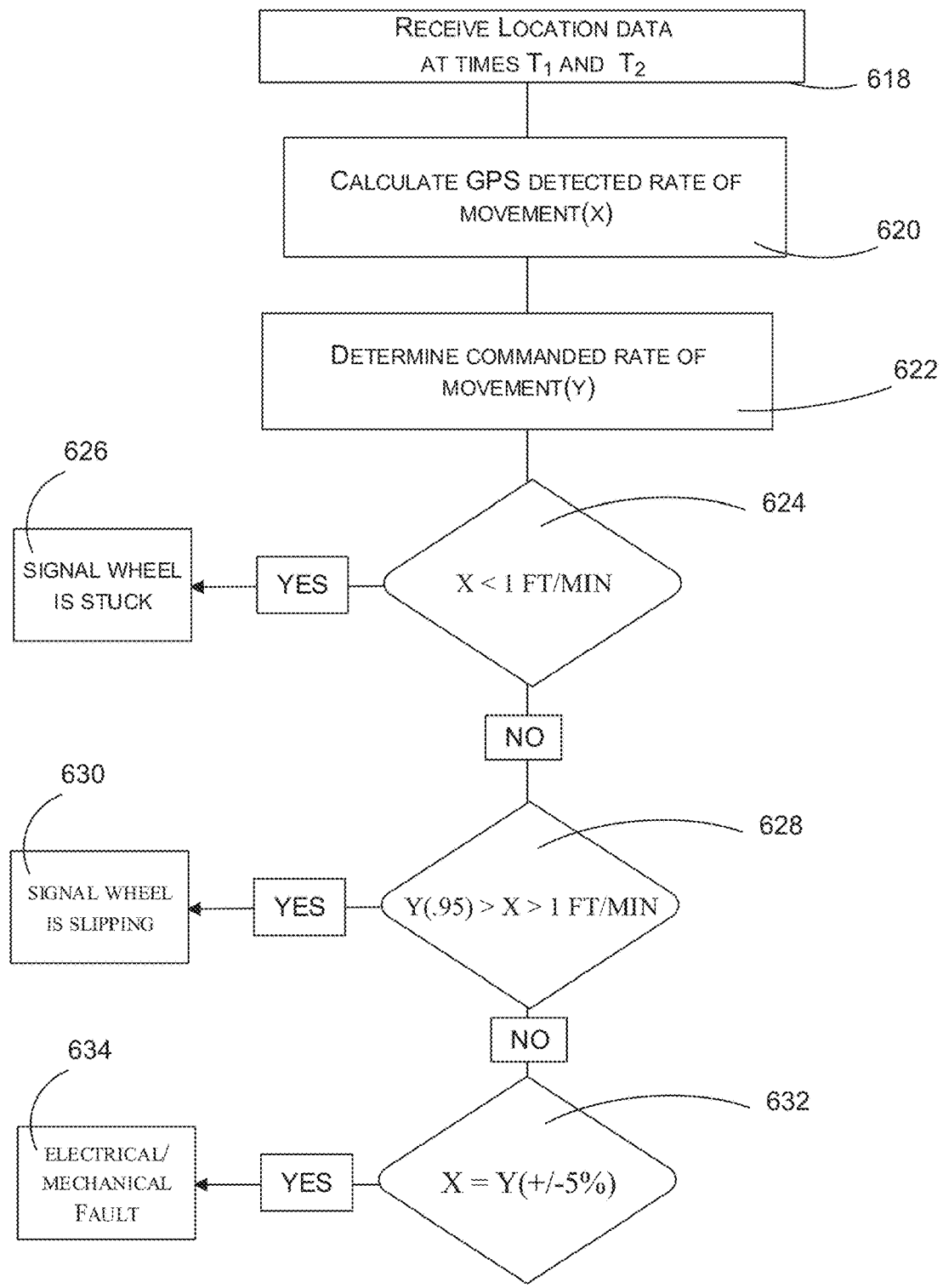
FIG. 8 shows further steps of the exemplary algorithm shown in FIG. 7.

With reference now to FIG. 8, an exemplary movement analysis algorithm may include a first step 618 of receiving or recalling location data at a first time ($T_1$) and a second time ($T_2$). At a next step 620, the system may calculate the rate of ground movement (X) over the measured time period. At a next step 622, the system may receive, recall or calculate the commanded rate of movement (Y) (i.e. the inputted rate of movement). At a next step 624, the system may calculate whether the rate of movement (X) is less than a specified threshold level selected to indicate impaired movement (e.g. 1 ft/minute). The selected threshold may be selected and/or adjusted as desired depending on factors such as wheel size, commanded speed and the like. At a next step 626, if the determined speed (X) is less than the threshold level, the system may preferably generate a signal indicating that a drive wheel is stuck. If the initial threshold level is exceeded, the system at step 628 may compare the commanded speed (Y) to the determined speed. If the determined speed (X) is less than a selected percentage of the commanded speed (Y) (e.g. 95%), the system at step 630 may generate a signal indicating that the wheel is experiencing slipping, loss of traction or the like. At step 632, if the determined speed (X) is within an acceptable range of the commanded speed (Y) (i.e. +/−5%), but with an unusually high current/power draw, then the system at step 634 may determine and create a signal communicating that an electrical or mechanical fault exists. For example, the system may trigger a warning regarding bad bearings, incipient motor failure or the like.

Field Location Data Analysis

With respect to the field location analysis (FIG. 7, step 614), the system of the present invention may analyze characteristics of a given field location along with the voltage/current measurements from a given drive tower to determine the status of a given drive wheel. According to a preferred embodiment, the field location analysis may incorporate logic, a look-up table or the like to match field locations and measured current values to trigger notices and/or actions. An exemplary look-up table of values and event triggers is provided in Table II and discussed with respect to FIG. 9 below.

TABLE II

Field Location Analysis

| % of Normal Voltage/Current (Z) | Field Slope | Determined Issue |
|---|---|---|
| Z < 100% | NEGATIVE OR ZERO SLOPE | LOWER LOAD |
| Z < 100% | POSITIVE SLOPE | MECHANICAL ISSUE |
| 130% > Z > 100% | NEGATIVE OR ZERO SLOPE | MECHANICAL ISSUE |
| 130% > Z > 100% | POSITIVE SLOPE | HIGHER LOAD |
| Z > 130% | N/A | WHEEL IS STUCK |

Figure 9:
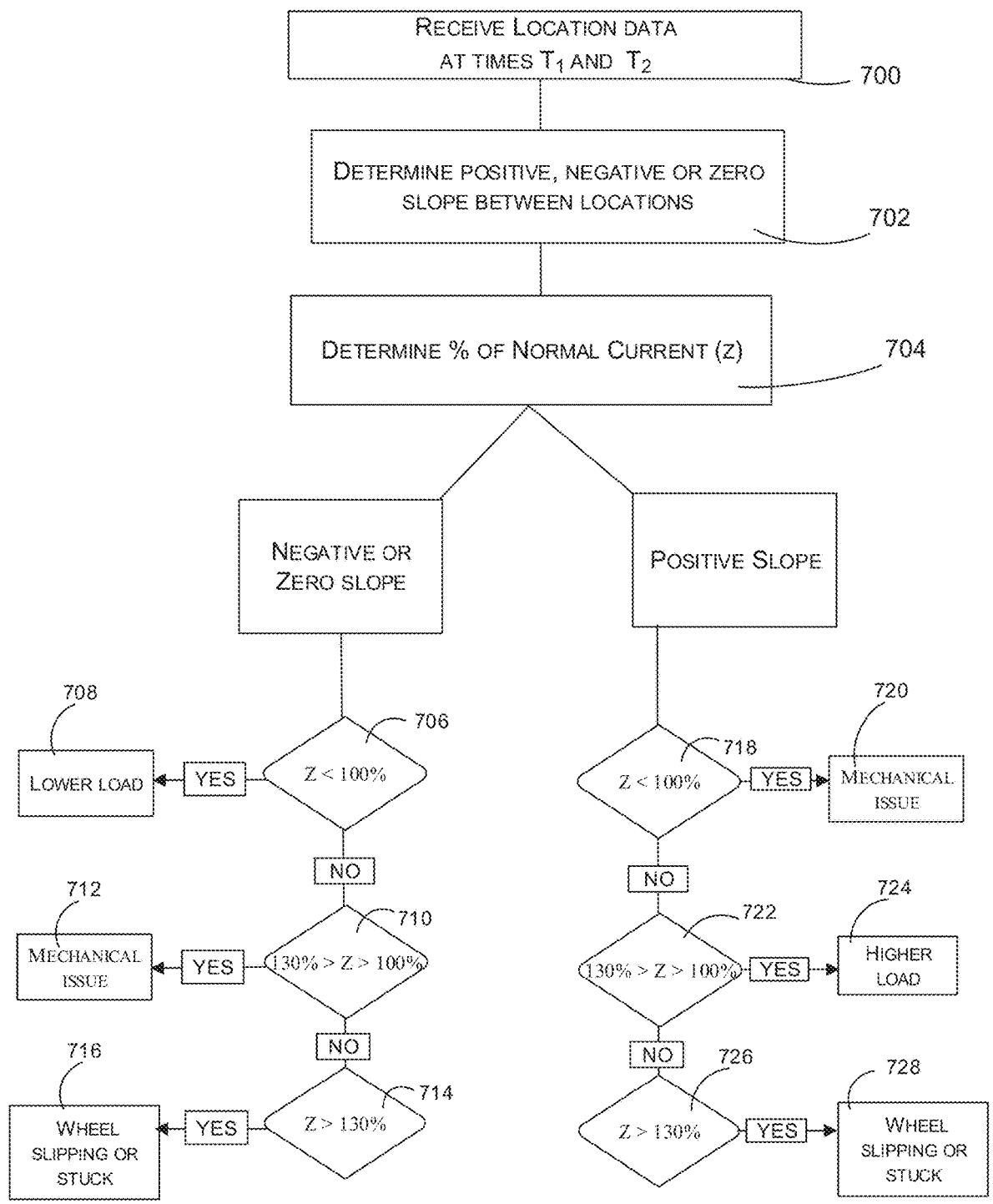
FIG. 9 shows further steps of the exemplary algorithm shown in FIG. 8.

With reference now to FIG. 9, an exemplary algorithm may include a first step 700 of receiving or recalling location data at a first time ($T_1$) and a second time ($T_2$). At a next step 702, the system may look-up the slope for the detected location during the measured time period. Alternatively, the system may determine the slope based on input from a sensor such as gyroscopic sensor or the like. At a next step 704, the system may calculate the relative percentage/ratio (Z) of the measured current value against a calculated normal current value. The calculated normal current value may be determined from detected machine specifications and conditions (e.g. speed, weight, RPMs and the like). According to alternative embodiments, the same calculation may be made for measured voltage levels and/or any other electrical characteristic.

If the determined slope for the detected location is negative or zero (i.e. downhill or level relative to the direction of travel), the system may proceed to analyze the relative percentage (Z) of the current value. At step 706, if the relative percentage (Z) of the current value is determined to be lower than normal, the system in step 708 may conclude that the lower current values are due to a lower load event. At step 710, if the relative percentage (Z) of the current value is determined to be within a first given range (e.g. 100%-130%), the system at step 712 may conclude that the higher values indicate a mechanical issue. At step 714, if the relative percentage (Z) of the current value is determined to be higher than the first given range (e.g. Z>130%), the system at step 716 may conclude and signal that a given wheel or tower is slipping or stuck.

If the determined slope for the detected location is positive (i.e. uphill relative to the direction of travel), the system may proceed to analyze the relative percentage (Z) of current value against a different set of outcomes. For example, at step 718, if the relative percentage (Z) of the current value is determined to be lower than normal, the system in step 720 may conclude that the lower current values are due to a mechanical issue. At step 722, if the relative percentage (Z) of the current value is determined to be with a first given range (e.g. 100%-130%), the system may at step 724 may conclude that the higher values may indicate a high load event. At step 726, if the relative percentage (Z) of the current value is determined to be higher than the first given range (e.g. Z>130%), the system at step 728 may conclude and signal that a given wheel or tower is slipping or stuck.

RTK-Corrected Distance Analysis

For distance analysis (FIG. 7, step 615), the system may preferably use the following formula to calculate the amount of "slippage"/loss of traction experienced at a given field location:

$$\frac{\text{Commanded Speed} * \text{Time}}{RTK, GPS \text{ Detected Distance}} = \text{Calculated Slippage \%}$$

Further, the system may assign a calculated percentage for each section of a given field for later reference and to provide notice regarding problem areas in a given field. Using this stored data, the system may determine whether a given increase in electrical current represents a repair issue or a field condition issue by comparing sensed current/voltage levels to previous current/voltage levels measured at the same field locations at the same sensed speeds.

System Responses

The algorithms of the present invention may preferably further include sets of pre-programmed responses which may be triggered by a given determined status of a given drive wheel/tower. Preferably, such responses may be stored in a look-up table for execution by the controller. Alternatively, the responses may be incorporated into individual instructions executed by the controller. Exemplary responses are provided in Table III below.

TABLE III

Exemplary Responses

| DETERMINED STATUS | RESPONSE |
|---|---|
| MECHANICAL ISSUE | SHUTDOWN MACHINE |
|  | GENERATE NOTIFICATION |
| WHEEL IS SLIPPING | SLOW DOWN ADJACENT DRIVE TOWERS |
|  | GENERATE NOTIFICATION |
| WHEEL IS SEVERELY SLIPPING | SLOW DOWN ADJACENT DRIVE TOWERS |
|  | PULSE SPRINKLERS TO MAINTAIN APPLICATION RATE |
|  | GENERATE NOTIFICATION |
| WHEEL IS STUCK | ALLOW ADJACENT DRIVE UNITS TO LEAD STUCK DRIVE UNIT |
|  | RECORD LOCATION/MACHINE |

TABLE III-continued

Exemplary Responses

| DETERMINED STATUS | RESPONSE |
|---|---|
| ANGLE/POSITION | GENERATE NOTIFICATION |

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the systems of the present invention may be used with any arrangement of drive towers including both linear and center pivot systems. Further, as needs require, the processes for transmitting data within the present invention may be designed to be push or pull in nature. Still, further, each feature of the present invention may be made to be remotely activated and accessed from distant monitoring stations. Accordingly, data may preferably be uploaded to and downloaded from the present invention as needed.

The scope of the present invention should be determined not by the embodiments illustrated, but by the appended claims and their legal equivalents.

What is claimed is:

1. A system for determining drive wheel status within an irrigation machine, the system comprising:
   a first drive unit, wherein the first drive unit comprises a first drive tower, a first drive controller, a first drive motor and a first drive wheel; wherein the first drive unit further comprises a first sensing system; wherein the first sensing system is configured to measure the duty cycle and the operating current of the first drive motor;
   a second drive unit, wherein the second drive unit comprises a second drive tower, a second drive controller, a second drive motor and a second drive wheel; wherein the second drive unit further comprises a second sensing system; wherein the second sensing system is configured to measure the duty cycle and the operating current of the second drive motor;
   a first gyroscopic sensor, wherein the first gyroscope sensor is configured to detect an amount of slope at the location of the first drive unit;
   a second gyroscopic sensor, wherein the second gyroscope sensor is configured to detect an amount of slope at the location of the second drive unit;
   a first GPS receiver, wherein the first GPS receiver is configured to detect the location of the first drive unit;
   a second GPS receiver, wherein the second GPS receiver is configured to detect the location of the second drive unit;
   at least one remote database, wherein the at least one remote database comprises stored historic sensor and field data; and
   a machine analysis module, wherein the machine analysis module is configured to analyze data from the first and second sensing systems, the first and second GPS sensors, and the first and second gyroscopic sensors; further wherein the machine analysis module is configured to apply at least one current algorithm which analyzes the status of the first and second drive wheels based on detected operating currents of the first and second drive motors; further wherein the machine analysis module is configured to produce notifications based on a determined status of the first and second drive wheels; further wherein the at least one current algorithm comprises an algorithm selected from the group of algorithms comprising: a field location algorithm and a distance analysis algorithm.

2. The system of claim 1, wherein the machine analysis module comprises a movement rate algorithm; wherein the movement rate algorithm determines the status of a drive wheel based on a comparison of a commanded speed and a measured machine speed.

3. The system of claim 2, wherein the field location algorithm comprises an algorithm which determines the status of the first drive wheel based on a comparison of the operating current of the first drive unit and the detected slope at the location of the first drive unit.

4. The system of claim 3, wherein the distance analysis algorithm comprises an algorithm which determines an amount of traction loss of the first drive wheel based on a ratio of a calculated distance and a measured distance; wherein the calculated distance is determined based on a commanded speed over a measured time period; further wherein the measured distance is measured using RTK-Corrected GPS data over a measured time period.

5. The system of claim 4, wherein the machine analysis module comprises a location algorithm which stores field location data linked with previously detected electrical current levels for a plurality of field locations.

6. The system of claim 5, wherein the machine analysis module comprises a repair algorithm which detects a repair issue by comparing a first sensed current level at a first location with a second sensed current level previously recorded for the first location.

7. The system of claim 6, wherein the machine analysis module comprises a field condition algorithm which compares the first sensed current level at the first location with the second sensed current level previously recorded for the first location.

8. The system of claim 7, wherein the machine analysis module comprises a response algorithm which includes a plurality of pre-programmed responses which are triggered in response to a determined status of the irrigation machine.

9. The system of claim 8, wherein the response algorithm comprises an instruction to shut down the irrigation machine and issue a notification when the machine analysis module detects a repair issue.

10. The system of claim 9, wherein the machine analysis module comprises a traction algorithm which determines when the first drive wheel has reduced traction.

11. The system of claim 10, wherein the traction algorithm comprises an instruction to slow down the second drive unit when the first drive wheel is determined to have reduced traction.

12. The system of claim 11, wherein the traction algorithm determines a coefficient of traction for the first drive wheel at third location.

13. The system of claim 12, wherein the traction algorithm comprises an instruction to slow down the second drive unit and pulse a plurality of sprinklers to maintain a target application rate when the traction algorithm determines that the coefficient of traction for the first drive wheel at the third location is below a first preset coefficient of traction.

14. The system of claim 13, wherein the traction algorithm comprises an instruction to adjust an alignment parameter when the traction algorithm determines that the first drive wheel at the third location is below a second preset coefficient of traction.

15. The system of claim 14, wherein the field location algorithm determines a first mechanical issue based on a detection of a positive slope and a decreased current.

16. The system of claim 15, wherein the field location algorithm determines a second mechanical issue based on the detection of a slope equal to or greater than zero and a current level exceeding 100% of a preset current value.

* * * * *